March 27, 1962     M. D. KARLSTAD, JR     3,027,177
TORSION BAR WHEEL SUSPENSION
Filed July 21, 1959     3 Sheets-Sheet 2
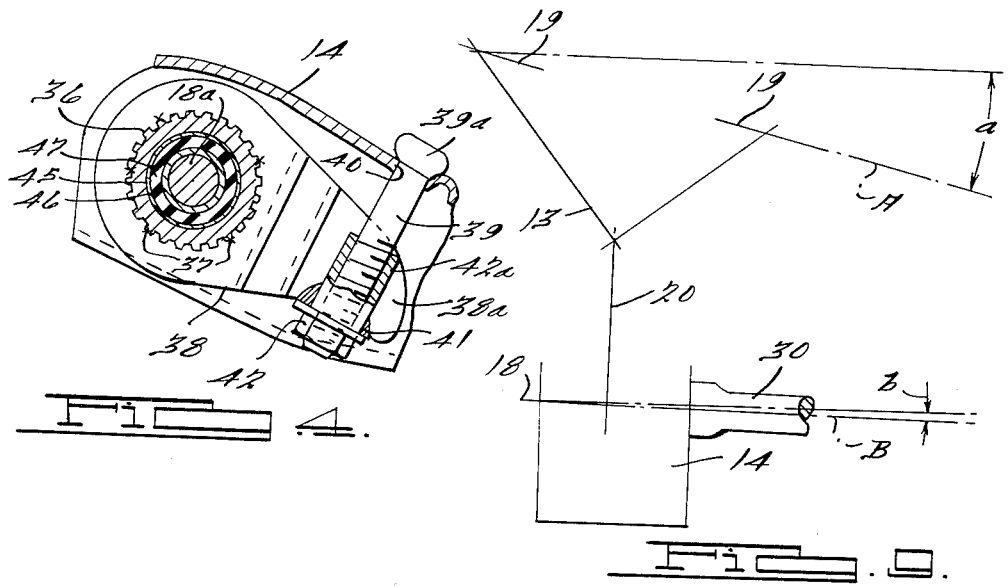
FIG. 4.
FIG. 5.
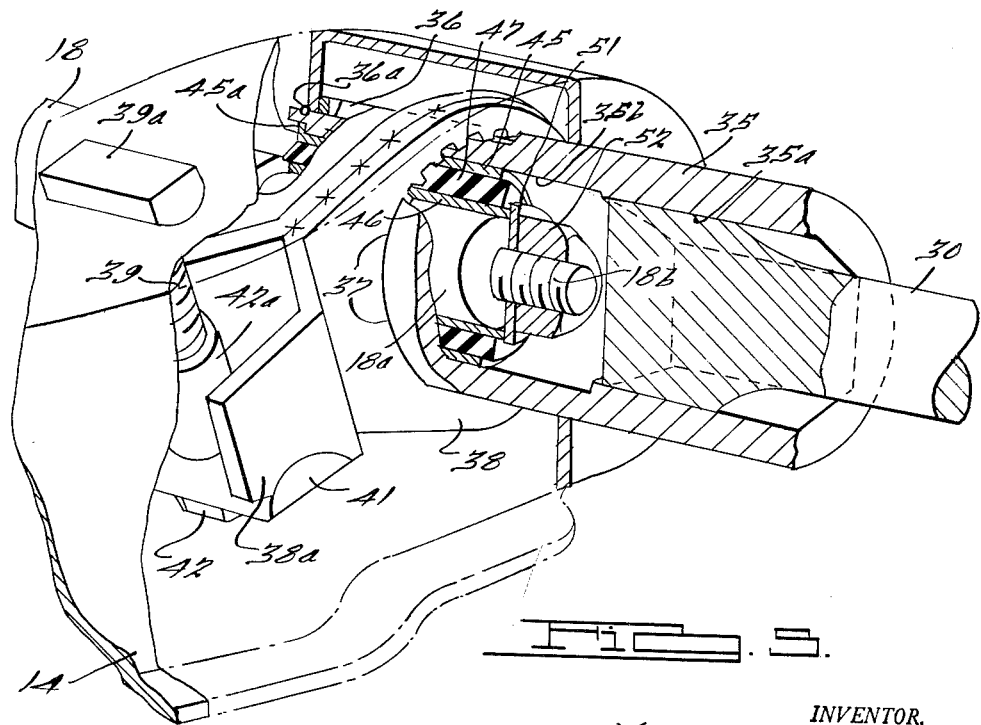
FIG. 6.
INVENTOR.
Maurice D. Karlstad, Jr.
BY
Harness and Harris
ATTORNEYS.

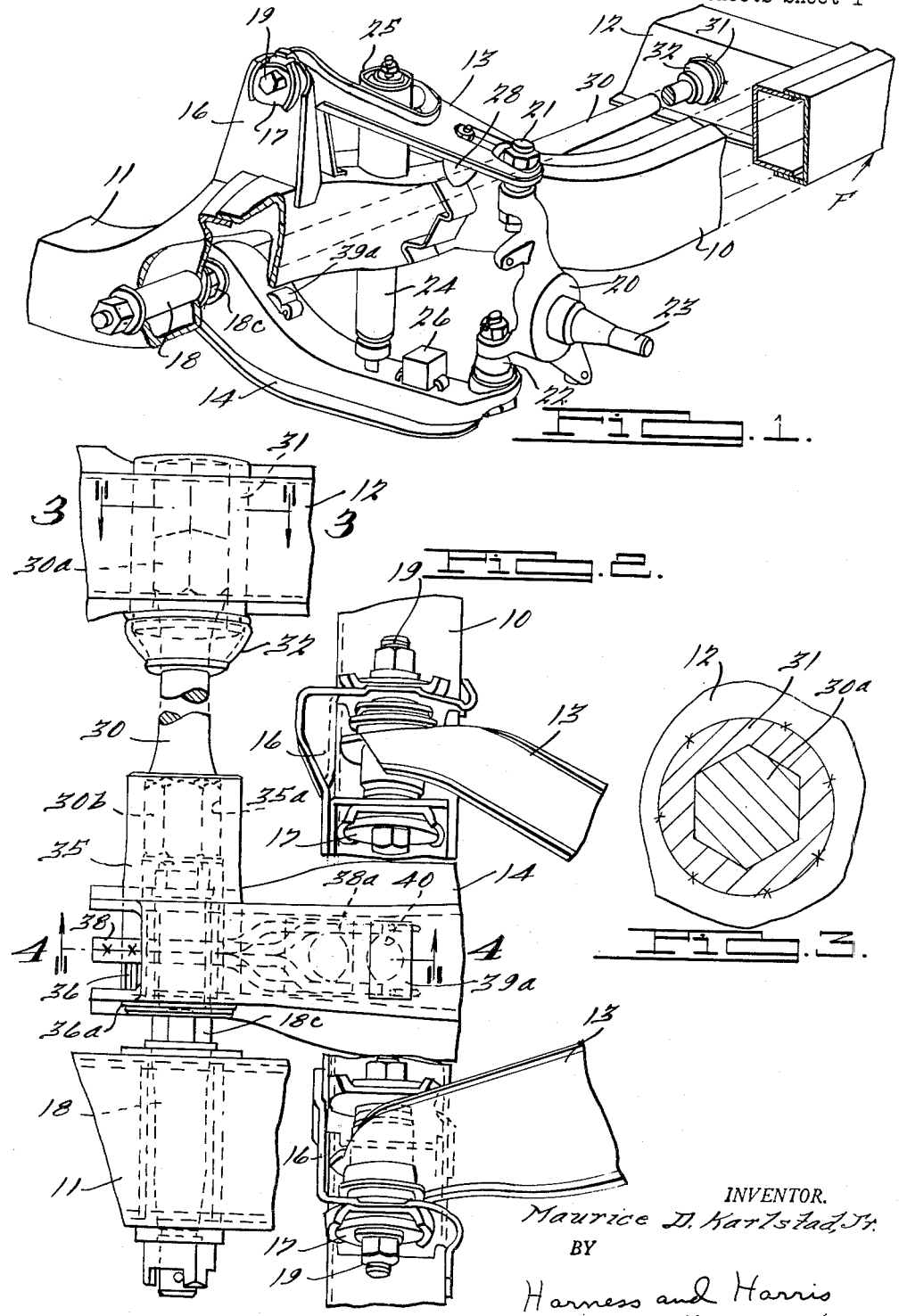

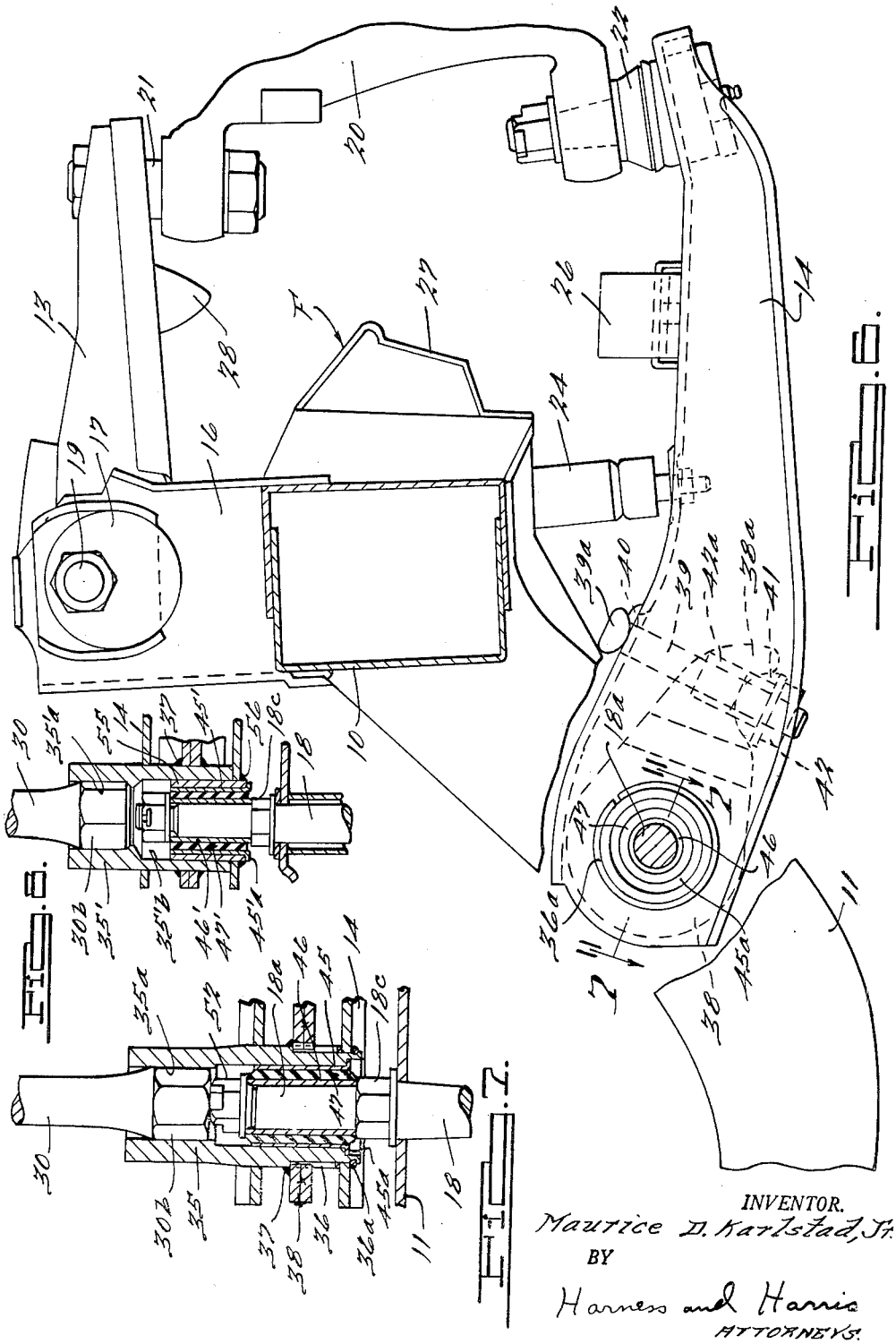

United States Patent Office 3,027,177
Patented Mar. 27, 1962

3,027,177
TORSION BAR WHEEL SUSPENSION
Maurice D. Karlstad, Jr., Warren, Mich., assignor to Chrysler Corporation, Highland Park, Mich., a corporation of Delaware
Filed July 21, 1959, Ser. No. 828,486
9 Claims. (Cl. 280—124)

This invention relates to a torsion bar wheel suspension and particularly to the manner of adjustably mounting a torsion bar in a vehicle chassis having independently sprung wheels.

It is a primary object of this invention to provide an improved manner of connecting a torsion bar to a control arm of an independently sprung vehicle wheel such that ready adjustment of the torsion bar may be accomplished with maximum ease and accessibility.

It is another object of this invention to provide a torsion bar wheel suspension wherein the torsion bar can be placed at the lowest possible level that will still give the required road clearance and not interfere with any other portions of the vehicle body or chassis or with the preferred chassis geometry.

It is still another object of this invention to provide the adjustable connection between a torsion bar and its associated wheel supporting control arm such that the fixedly anchored end of the torsion bar will require the minimum amount of space and thereby permit lowering of the vehicle body floor in the area overlying the fixedly anchored end of the torsion bar.

This invention is an improvement over certain inventions disclosed in the copending U.S. patent application of John E. Collier and Maurice D. Karlstad, Jr. Serial No. 666,293, now Patent No. 2,972,489, dated February 21, 1961.

Other objects and advantages of this invention will become readily apparent from a consideration of the following description and the related drawings wherein:

FIG. 1 is fragmentary perspective view of a portion of a motor vehicle frame having a torsion bar sprung wheel assembly embodying this invention;

FIG. 2 is a top plan view of portions of the assembly shown in FIG. 1, certain portions of the FIG. 1 assembly having been broken away for the sake of clarity;

FIG. 3 is an enlarged sectional elevational view taken along the line 3—3 of FIG. 2;

FIG. 4 is a sectional elevational view taken along the line 4—4 of FIG. 2;

FIG. 5 is an enlarged, fragmentary perspective view of the connection between the torsion bar and lower control arm of the assembly shown in FIG. 1, portions of the assembly being broken away for the sake of clarity.

FIG. 6 is a front end elevational view of the torsion spring wheel assembly shown in FIG. 1;

FIG. 7 is a sectional elevational view taken along the line 7—7 of FIG. 6;

FIG. 8 is a modified form of the invention similar to what is shown in FIG. 7; and FIG. 9 is a diagrammatic line sketch of the wheel assembly mounting in side elevation.

FIG. 1 of the drawings shows a portion of a motor vehicle wheel supporting frame F that includes a longitudinally extending side rail 10 and a pair of transversely extending, longitudinally spaced, cross rails 11 and 12 respectively. Extending outwardly from and transversely of the side rail 10 and pivotally connected to frame F for swinging movement about longitudinally extending pivot axes are upper and lower wheel supporting control arms 13 and 14 respectively. Upper control arm 13, which is substantially V-shaped in plan, is mounted on the frame side rail 10 by means of upstanding brackets 16 that support pivot pins 19 which include caster and camber adjustment means 17. Adjustment means 17 form no part of this invention. The disclosed adjustment means 17 is described in detail in the copending application of Robert H. Kushler et al., Serial No. 753,037, filed August 4, 1958 and now Patent No. 2,954,998, dated October 4, 1960. The lower control arm 14 is pivotally mounted on the cantilever-type pivot shaft 18 that is supported by the frame cross rail 11. This pivot shaft 18 and its associated torsion bar connecting means will be described in detail hereafter.

Control arms 13 and 14 have a wheel supporting knuckle 20 pivotally connected thereto by means of upper and lower ball joint connections 21 and 22 respectively. Knuckle 20 mounts a spindle 23 that is adapted to rotatably support a wheel (not shown). A shock absorber unit 24 is connected between the lower control arm 14 and a housing 25 seated on the frame side rail 10. Pivotal movement of the control arms 13, 14 is limited by engagement of the resilient bumpers 28, 26 with the frame mounted bumper bracket 27.

To provide for springing of the wheel supporting control arms 13, 14 the disclosed structure utilizes a torsion bar spring 30. Spring 30 has a hexagonally shaped rear end portion 30a (see FIG. 3) that is non-rotatably seated in the hexagonal socket in the cup-like sleeve 31 that is fixedly mounted in the frame cross rail 12. A boot 32 can be seated around the torsion bar 30 at the open end of the sleeve 31 to prevent the entrance of foreign matter into the socket connection.

As previously pointed out, a cantilever pivot shaft 18 is mounted in the frame cross member 11 so that a portion 18a thereof projects rearwardly to provide the bearing journal for the lower control arm 14. Lower control arm 14 has a sleeve 35 extending transversely thereof and rotatably mounted therein for rotatable movement about an axis extending longitudinally of the frame F. A snap ring 36a prevents disengagement of the sleeve 35 from the control arm 14. Non-rotatably connected to the outer peripheral surface of the sleeve 35 by splineways 36 and/or welding 37 is a radially extending crank lever 38. Lever 38 has a bifurcated end 38a that is adapted to receive an adjustment bolt 39. Bolt 39 has a head portion 39a that is adapted to be rockably mounted in a seat formed in the upper wall portion of the lower control arm 14. The seat is pierced by an aperture 40 that loosely receives the shank portion of bolt 39. Extending crosswise beneath and seated against the underside of the crank end bifurcated portion 38a is semi-cylindrical washer element 41. Engageable with the underside of the washer 41 is a nut 42. Nut 42 has a threaded sleeve-like collar 42a that threadably engages the shank of the bolt 39. From the foregoing description it is thought to be obvious that screwing nut 42 up on the shank of bolt 39 will cause clockwise rotation (see FIG. 5) of the crank 38 relative to the lower control arm 14. This rotation of the sleeve 35 is utilized to adjust the pre-set torsional stress in the torsion bar 30 as will become apparent from the following description.

From FIGS. 5 and 7 particularly it will be noted that the control arm 14 and its attached sleeve 35 are rotatably mounted on the pivot pin journal 18a by means of a resilient bushing unit of well-known construction. The bushing unit comprises an outer shell 45 that is pressed into the cylindrical bore 35b in sleeve 35. The exposed end 45a of the bushing outer shell 45 is turned over to anchor the bushing shell 45 against the end of the sleeve 35. Bushing inner shell 46 is journaled on the pivot pin portion 18a. A collar of pre-compressed rubber-like material 47 extends between the inner and outer shells 45 and 46. The resilient collar 47 cushions any shock loads transmitted between the control arm 14 and its pivot 18a. Resilient bushing units of this same type are also used to mount the upper control arm 13 on the pivot pins 19.

In order to fixedly attach the lower control arm bushing unit 45–47 and its connected sleeve 35 and control arm 14 to the pivot shaft 18a, a washer 51 and nut 52 are mounted on the threaded projection 18b extending axially from the pivot shaft portion 18a. Washer 51 is of sufficient dimeter to abut against the adjacent end of the bushing inner shell 46. When the nut 52 is threaded on projection 18b it anchors the shell 46 against the nut-like enlargement 18c formed on the intermediate portion of the pivot shaft 18. With nut 52 turned up tight against the washer 51 it is thought to be obvious that the lower control arm 14 and its attached relatively rotatable sleeve 35 will be anchored to the pivot shaft 18 for rotation thereon.

The rear end portion 35a of the sleeve 35 is provided with a hexagonal socket formation to matingly receive the hexagonally formed front end portion 30b of the torsion bar spring 30. A resilient boot (not shown) similar to the boot 32 used at the rear end of torsion bar 30 can also be used on the front end of the bar 30 to prevent the entrance of foreign matter into the non-rotatable connection of the bar 30 to the sleeve portion 35a.

With the torsion bar mounting heretofore described, it is thought to be apparent that the torsion bar 30 is coaxial with the lower control arm pivot axis 18 and, as can be seen from FIG. 9, extends downwardly from the horizontal by the angle b. The line B (see FIG. 9) represents the centerline of the torsion bar 30 and it is coaxial with the axis of pivot pin 18. The rearwardly and downwardly extending torsion bar 30 provides a definite advantage in that it permits the vehicle floor above the torsion bar to be lowered the maximum amount. Furthermore, by having the torsion bar adjustment means 35, 38, 39, 41, 42 located at the front end of the torsion bar 30 rather than at the rear end of the bar 30 the minimum amount of space need be used for the anchoring of the rear end of the torsion bar 30 to the rear cross rail 12 and therefore the vehicle floor in the area of the cross rail 12 can be located at the lowest possible level. Another advantage of the arrangement of the torsion bar stress adjusting means at the front end of the bar 30 is that it is in a position where it is readily accessible and in addition it uses the bearing supported sleeve 35 for a dual function, namely, an anchor for the connection of the torsion bar 30 to the lower control arm 14 and a crank hub for rotatable adjustment of the front end of the bar 30. There is no need to specially shape the rear cross rail 12 to seat an adjustable connection for the rear end of the torsion bar such as is shown in the aforenoted application of John E. Collier et al., Serial No. 666,293. As the sleeve 35 must be used to connect the front end of the torsion bar 30 to the lower control arm 14 it is an economic, as well as a mechanical advantage, to add the crank 38 to the sleeve 35 and then use the sleeve 35 for both a connection member and a stress adjusting member. In addition space is not at a premium at the front end of the torsion bar 30 so a large size readily accessible adjusting means can be used at the front end portion 30b of bar 30 whereas current car designs demand that the floor of the vehicle in the passenger area should be at the lowest possible level to give the maximum passenger comfort with the current low silhouette or body shape.

In FIG. 8 is shown a slightly modified form of connection between the torsion bar connector sleeve 35' and the lower control arm 14. In this form of the invention all parts or elements that are identical to those shown in the FIGS. 1–7 form bear the same reference numerals. The resilient bushing 45'–47' that journals the sleeve 35' on the pivot shaft portion 18a is substantially identical to the resilient bushing 45–47 of the FIG. 1–7 form. The only difference being the manner of connecting the outer bushing shell 45' to the sleeve 35'. Instead of pressing the outer shell 45' directly into the bore 35'a, as taught by the FIG. 1–7 form, in the FIG. 8 form an attachment collar 55 is fixedly mounted in the bore 35'b of sleeve 35 by the welded connection 56. The outer shell 45' is then pressed into the bore of the collar 55 and with such an arrangement a very rigid, but resiliently cushioned, connection exists between the sleeve 35' and the lower control arm 14. As was the case with the FIGS. 1–7 form of the invention, welding 37 non-rotatably connects the crank 38 to the outer peripheral surface of the sleeve 35'. In the FIG. 8 form of the invention the welded connection 56 between the collar 55 and the control arm 14 has been substituted for the snap ring connection 36a of the FIGS. 1–7 form of the invention. All of the advantages of the FIGS. 1–7 form of the invention are inherent in the FIG. 8 form and, in addition, a more rigid assembly is possible with the FIG. 8 form.

I claim:

1. In a vehicle, a wheel supporting frame, an upright wheel carrying member, means connecting said wheel carrying member to said supporting frame for rising and falling movement relative thereto including a control arm extending transversely of said frame and connected thereto for swinging movement about an axis extending longitudinally of said frame, the swinging pivot connection between said arm and said supporting frame including a cantilever pivot shaft carried by said supporting frame and extending longitudinally thereof and mounting a sleeve carried by and rotatable relative to said arm and coaxially journalled on said cantilever pivot shaft, a torsion bar spring having one end portion non-rotatably connected to said sleeve and the other end portion fixedly anchored to said supporting frame so as to be coaxial with said pivot shaft, and means to torsionally stress said torsion bar spring comprising crank means arranged concentrically about said sleeve and pivot shaft and connected to said sleeve and anchored to said control arm by means providing for adjustable pre-stressing of said torsion bar spring, said pre-stressing means comprising an adjustable length connector anchored between said crank means and said control arm.

2. In a vehicle, a wheel supporting frame, an upright wheel carrying member, means connecting said wheel carrying member to said supporting frame for rising and falling movement relative thereto including a pair of vertically spaced control arms extending transversely of said frame and connected thereto for swinging movement about vertically spaced axes extending longitudinally of said frame, the swinging pivot connection between one of said arms and said supporting frame including a cantilever pivot shaft carried by said supporting frame and extending longitudinally thereof and mounting a sleeve carried by and rotatable relative to said one arm and coaxially journalled on said cantilever pivot shaft, a torsion bar spring disposed generally longitudinally of the vehicle having one end portion thereof non-rotatably connected to said sleeve and the other end portion fixedly anchored to said supporting frame so as to be coaxial with said pivot shaft, and means to torsionally stress said torsion bar spring comprising crank means fixedly connected to said sleeve and concentrically arranged relative to said sleeve and said pivot shaft, and means to anchor said crank means to said one arm for adjustment with respect thereto.

3. In a vehicle, a wheel supporting frame, an upright wheel carrying member, means connecting said wheel carrying member to said supporting frame for rising and falling movement relative thereto including a pair of vertically spaced upper and lower control arms extending transversely of said frame and connected thereto for swinging movement about vertically spaced axes extending longitudinally of said frame, the connection between the lower one of said arms and said supporting frame including a cantilever pivot shaft carried by said supporting frame and extending longitudinally thereof, said lower arm mounting a sleeve that is rotatable relative to said lower arm that is journalled on said cantilever pivot shaft with radial clearance space therebetween, a bushing in said clearance space between said sleeve and said cantilever pivot shaft, a torsion bar spring disposed generally longitudinally of the vehicle frame having one end portion thereof non-rotatably connected to said sleeve and the other end portion anchored to said supporting frame, and means to torsionally stress said torsion bar spring comprising crank means fixedly connected to said sleeve and connected to said lower arm by an adjustable length connector to provide for adjustment of the pre-set torsional stress in said torsion bar spring.

4. In a vehicle, a wheel supporting frame, an upright wheel carrying member, means connecting said wheel carrying member to said supporting frame for rising and falling movement relative thereto including a pair of vertically spaced upper and lower control arms extending transversely of said frame and connected thereto for swinging movement about vertically spaced axes extending longitudinally of said frame, the connection between the lower one of said arms and said supporting frame including a cantilever pivot shaft carried by said supporting frame and extending longitudinally thereof, said lower arm mounting a sleeve that is rotatable relative to said lower arm that is journalled on said cantilever pivot shaft with radial clearance space therebetween, a bushing in said clearance space between said sleeve and said cantilever pivot shaft, a torsion bar spring disposed generally longitudinally of the vehicle frame having one end portion thereof non-rotatably connected to said sleeve and the other end portion anchored to said supporting frame, and means to torsionally stress said torsion bar spring comprising crank means fixedly connected to said sleeve and connected to said lower arm by an adjustable length connector to provide for adjustment of the pre-set torsional stress in said torsion bar spring, said connector comprising a bolt and nut mechanism connected in tension between the crank arm and the lower control arm.

5. In a vehicle, a wheel supporting frame, an upright wheel carrying member, means connecting said wheel carrying member to said supporting frame for rising and falling movement relative thereto including a pair of vertically spaced upper and lower control arms extending transversely of said frame and connected thereto for swinging movement about vertically spaced axes extending longitudinally of said frame, the connection between the lower one of said arms and said supporting frame including a cantilever pivot shaft carried by said supporting frame and extending longitudinally thereof, said lower arm mounting a sleeve that is rotatable relative to said lower arm that is journalled on said cantilever pivot shaft with radial clearance space therebetween, a resilient bushing mounted in the bore in said sleeve and filling said clearance space between said sleeve and said cantilever pivot shaft, a torsion bar spring disposed generally longitudinally of the vehicle frame having one end portion thereof non-rotatably connected to said sleeve and the other end portion anchored to said supporting frame, and means to torsionally stress said torsion bar spring comprising crank means fixedly connected to said sleeve and connected to said lower arm by an adjustable length connector to provide for adjustment of the pre-set torsional stress in said torsion bar spring.

6. In a vehicle, a wheel supporting frame, an upright wheel carrying member, means connecting said wheel carrying member to said supporting frame for rising and falling movement relative thereto including a pair of vertically spaced upper and lower control arms extending transversely of said frame and connected thereto for swinging movement about vertically spaced axes extending longitudinally of said frame, the connection between the lower one of said arms and said supporting frame including a cantilever pivot shaft carried by said supporting frame and extending longitudinally thereof, said lower arm mounting a sleeve that is rotatable relative to said lower arm that is journalled on said cantilever pivot shaft with radial clearance space therebetween, a collar coaxial with and fixed in the bore in said sleeve and a bushing seated in the bore in said collar to fill said clearance space between said sleeve and said cantilever pivot shaft, a torsion bar spring disposed generally longitudinally of the vehicle frame having one end portion thereof non-rotatably connected to said sleeve and the other end portion anchored to said supporting frame, and means to torsionally stress said torsion bar spring comprising crank means fixedly connected to said sleeve and connected to said lower arm by an adjustable length connector to provide for adjustment of the pre-set torsional stress in said torsion bar spring.

7. In a vehicle, a wheel supporting frame comprising spaced transversely extending cross rails connected by a longitudinally extending side rail, an upright wheel carrying member, means connecting said wheel carrying member to said supporting frame for rising and falling movement relative thereto including vertically spaced upper and lower control arms extending transversely of said frame and connected thereto for swinging movement about vertically spaced axes extending longitudinally of said frame, the upper control arm being pivotally connected to said side rail and the lower control arm being pivotally connected to one of said cross rails by means of a cantilever pivot shaft carried by said one cross rail, a sleeve carried by and rotatable relative to said lower arm and journalled on said cantilever pivot shaft with radial clearance space therebetween, a resilient bushing in said clearance space between said sleeve and said cantilever pivot shaft, a torsion bar spring disposed generally longitudinally of the frame side rail having one end portion thereof non-rotatably connected to said sleeve and the other end portion anchored to the other cross rail, and means to torsionally stress said torsion bar spring comprising crank means fixedly connected to said rotatable sleeve and an adjustable connector to anchor said rotatable crank means to said lower control arm.

8. In a vehicle, a wheel supporting frame comprising spaced transversely extending cross rails connected by a longitudinally extending side rail, an upright wheel carrying member, means connecting said wheel carrying member to said supporting frame for rising and falling movement relative thereto including vertically spaced upper and lower control arms extending transversely of said frame and connected thereto for swinging movement about vertically spaced axes extending longitudinally of said frame, the upper control arm being pivotally connected to said side rail and the lower control arm being pivotally connected to one of said cross rails by means of a cantilever pivot shaft carried by said one cross rail, a sleeve carried by and rotatable relative to said lower arm and journalled on said cantilever pivot shaft with radial clearance space therebetween, a resilient bushing in said clearance space between said sleeve and said cantilever pivot shaft, a torsion bar spring disposed generally longitudinally of the frame side rail having one end portion thereof non-rotatably connected in the bore in said sleeve and the other end portion anchored to the other cross rail, and means to torsionally stress said torsion bar spring comprising crank means fixedly connected to said rotatable sleeve and an adjustable connector to anchor said rotatable crank means to said lower control arm in different positions to vary the pre-set stress in said torsion bar spring.

9. In a vehicle, a wheel supporting frame comprising spaced transversely extending cross rails connected by a longitudinally extending side rail, an upright wheel carrying member, means connecting said wheel carrying member to said supporting frame for rising and falling movement relative thereto including vertically spaced upper and lower control arms extending transversely of said frame and connected thereto for swinging movement about vertically spaced pivot axes extending longitudinally of said frame, one of the control arms being pivotally connected to said side rail and the other control arm being pivotally connected to one of said cross rails by means of a cantilever pivot shaft carried by said one cross rail, a sleeve carried by and rotatable relative to said other control arm and coaxially journalled on said cantilever pivot shaft, a torsion bar spring disposed generally longitudinally of the frame side rail having one end portion thereof non-rotatably connected to said sleeve and the other end portion anchored to the frame so as to be coaxial with said pivot shaft, and means to torsionally stress said torsion bar spring comprising crank means fixedly connected to said rotatable sleeve and concentrically arranged relative to said sleeve and said pivot shaft, and an adjustable length connector anchored to said other control arm to effect relative rotation between said sleeve and other control arm.

References Cited in the file of this patent

UNITED STATES PATENTS

| | | |
|---|---|---|
| 2,213,004 | Hickman | Aug 27, 1940 |
| 2,596,922 | Thoms | May 13, 1952 |

FOREIGN PATENTS

| | | |
|---|---|---|
| 615,165 | Germany | June 28, 1935 |
| 711,938 | Great Britain | July 14, 1954 |